(12) United States Patent
Shin et al.

(10) Patent No.: US 11,002,525 B2
(45) Date of Patent: May 11, 2021

(54) GEAR INSPECTION APPARATUS AND GEAR INSPECTION METHOD USING THE SAME

(71) Applicants: HYUNDAI MOTOR COMPANY, Seoul (KR); KIA MOTORS CORPORATION, Seoul (KR); Signallink Co., Ltd., Daejeon (KR)

(72) Inventors: Sang Jong Shin, Ulsan (KR); Hyun Choi, Suwon-si (KR)

(73) Assignees: HYUNDAI MOTOR COMPANY, Seoul (KR); KIA MOTORS CORPORATION, Seoul (KR); SIGNALLINK CO., LTD., Daejeon (KR)

( * ) Notice: Subject to any disclaimer, the term of this patent is extended or adjusted under 35 U.S.C. 154(b) by 232 days.

(21) Appl. No.: 16/210,132

(22) Filed: Dec. 5, 2018

(65) Prior Publication Data

US 2020/0033110 A1 Jan. 30, 2020

(30) Foreign Application Priority Data

Jul. 24, 2018 (KR) .................. 10-2018-0085893

(51) Int. Cl.
*G01B 5/20* (2006.01)
*G01B 11/24* (2006.01)
*G01M 13/021* (2019.01)

(52) U.S. Cl.
CPC .......... *G01B 5/202* (2013.01); *G01B 11/2416* (2013.01); *G01M 13/021* (2013.01)

(58) Field of Classification Search
CPC ........ G01B 21/08; G01B 21/18; G01B 5/202; G01B 11/2416; G01B 11/02; G01B 11/24; G01M 13/021; G01M 13/045
USPC ........................................ 33/501.7
See application file for complete search history.

(56) References Cited

U.S. PATENT DOCUMENTS

| | | | | | |
|---|---|---|---|---|---|
| 3,900,720 | A | * | 8/1975 | Konersmann | G01M 13/02 702/168 |
| 4,122,609 | A | * | 10/1978 | Flair | B23F 15/08 33/553 |
| 4,321,753 | A | * | 3/1982 | Fusari | G01B 7/146 33/501.8 |
| 4,519,141 | A | * | 5/1985 | Meder | G01B 5/202 33/501.9 |
| 4,704,799 | A | * | 11/1987 | Kobetsky | G01M 13/021 33/501.8 |
| 4,769,917 | A | * | 9/1988 | Bertz | G01B 5/202 33/501.18 |
| 4,841,644 | A | * | 6/1989 | Bertz | G01B 7/146 33/501.8 |

(Continued)

*Primary Examiner* — Yaritza Guadalupe-McCall
(74) *Attorney, Agent, or Firm* — Brinks Gilson & Lione

(57) ABSTRACT

A gear inspection apparatus includes: a measurement unit which has a probe installed to be movable forward and rearward relative to a work gear rotatably mounted on a frame, and measures a dimension of the work gear, which rotates, by a measurement ball provided at a tip of the probe; a drive unit which is installed on the frame so as to be connected to the measurement unit and moves the probe forward and rearward; and a controller which receives a displacement measurement value related to a position of the probe which is measured by the measurement unit, and converts the displacement measurement value into a digital value.

12 Claims, 6 Drawing Sheets

(56) References Cited

U.S. PATENT DOCUMENTS

| | | | | |
|---|---|---|---|---|
| 4,852,402 A * | 8/1989 | Bertz | ............... | G01B 5/202 |
| | | | | 73/162 |
| 5,231,875 A * | 8/1993 | Honda | ............. | G01M 13/021 |
| | | | | 33/501.13 |
| 5,461,797 A * | 10/1995 | Royer | ............. | G01B 5/202 |
| | | | | 33/501.14 |
| 5,609,058 A * | 3/1997 | Gnadt | ............. | B23F 19/02 |
| | | | | 73/162 |
| 7,117,609 B2 * | 10/2006 | Mies | ............. | B23F 23/06 |
| | | | | 33/501.9 |
| 2011/0179659 A1 * | 7/2011 | Yuzaki | ............. | G01B 5/202 |
| | | | | 33/501.9 |

* cited by examiner

GEAR INSPECTION APPARATUS AND GEAR INSPECTION METHOD USING THE SAME

CROSS-REFERENCE TO RELATED APPLICATION

This application claims priority to and the benefit of Korean Patent Application No. 10-2018-0085893, filed on Jul. 24, 2018, the entire contents of which are incorporated herein by reference.

FIELD

The present disclosure relates to a gear inspection apparatus and a gear inspection method using the same.

BACKGROUND

The statements in this section merely provide background information related to the present disclosure and may not constitute prior art.

In general, a gear is a rotational motion and rotational power transmission means and is used for various types of mechanical devices. There are various types of gears such as a spur gear, a helical gear, and a bevel gear.

A tooth surface of the gear is precisely processed in order to reduce or prevent abrasion, a loss of power transmission, and the occurrence of noise and vibration. Therefore, the gear having the completely processed tooth surface needs to be inspected to determine whether the tooth surface has defects and deficiency.

There are a dimension inspection method and a vibration inspection method as a method of inspecting the gear.

The dimension inspection method uses a three-dimensional measurer to measure whether the tooth surface of the gear is processed within a tolerance range.

That is, the dimension inspection method is a size measurement method that allows a master gear to mesh with a work gear, which is a measurement target, and measures an over ball diameter (OBD), run-out, nicks, and the like of the work gear based on the amount of change in straight distance which occurs when the master gear rotates.

Further, the vibration inspection method (vibration test) is a method which measures vibration signals that occurs when the master gear meshes with the work gear and rotates, and inspects processing quality by using a difference in frequency properties between the measured vibration signals.

However, we have discovered that the aforementioned gear inspection methods in the related art have drawbacks in that an operator needs to perform the measurements, while directly and manually rotating the work gear, which is the measurement target, and the dimension inspection and the vibration inspection need to be performed in different processes.

The above information disclosed in this Background section is only for enhancement of understanding of the background of the present disclosure and therefore it may contain information that does not form the prior art that is already known to a person of ordinary skill in the art.

SUMMARY

The present disclosure provides a gear inspection apparatus and a gear inspection method using the same for automatically inspecting a gear for processing quality that affects vibration and noise properties and a performance of a vehicle.

In one exemplary form of the present disclosure, a gear inspection apparatus includes: a measurement unit which has a probe installed to be movable forward and rearward relative to a work gear rotatably mounted on a frame, and measures a dimension of the work gear, which rotates, by a measurement ball provided at a tip of the probe; a drive unit which is installed on the frame so as to be connected to the measurement unit and moves the probe forward and rearward; and a controller which receives a displacement measurement value related to a position of the probe which is measured by the measurement unit, and converts the displacement measurement value into a digital value.

The gear inspection apparatus may further include a mounting unit which is installed on the frame and rotates the work gear.

The mounting unit may include: a clamping unit which is installed on an upper surface of the frame and inserted into a rotation center of the work gear; a spindle which is connected to a lower portion of the clamping unit; a spindle motor which is connected to the spindle through a belt and rotates the spindle by a predetermined angle; and a supply unit which is installed on the upper surface of the frame and connected to the clamping unit, and selectively supplies pneumatic pressure to the clamping unit so that the clamping unit clamps or unclamps the work gear.

An origin detecting sensor, which compensates for eccentricity of the spindle, may be installed on the spindle.

The measurement unit may include: a spring into which an end of the probe is inserted and which provides the probe with elastic force; a gear tooth detecting sensor which is configured to be movable forward and rearward, together with the probe, relative to the work gear and senses a gear crest of the work gear so that the measurement ball comes into contact with a gear trough of the work gear; and a displacement sensor which detects a magnitude of a movement displacement of the probe and transmits the magnitude of the movement displacement to the controller.

The drive unit may include: a drive motor which is installed on the frame; a moving block which is moved forward and rearward by the drive motor; an auxiliary block which is connected to the moving block, has an upper portion on which the probe is mounted, and moves forward and rearward together with the probe; a rail which is installed on the frame below the auxiliary block so that the auxiliary block slides along the rail; and a fixing block which is positioned at a front side of a spring in a state in which the probe is inserted into the fixing block, and supports the spring to compress the spring when the auxiliary block moves forward.

The controller may be electrically connected to a display unit that displays the digital value.

Another exemplary form of the present disclosure provides a gear inspection method using the gear inspection apparatus, the gear inspection method including: a first step of selecting the type of the work gear and selecting at least any one measurement item from dimension measurement and vibration measurement when the work gear is mounted on a clamping unit of the mounting unit; a second step of setting a start position by detecting a gear tooth of the work gear by a gear tooth detecting sensor of the measurement unit; and a third step of measuring a dimension of the work gear by moving the probe of the measurement unit forward and rearward relative to the work gear and inserting a measurement ball provided at a tip of the probe into each of the gear troughs of the work gear until the work gear completely rotates from the start position.

In the first step, the work gear may be clamped by the clamping unit when the work gear is mounted.

The start position may be set by the gear tooth detecting sensor when the probe moves forward toward the work gear and the measurement ball completely comes into contact with the gear trough of the work gear.

Until the work gear completely rotates from the start position, the third step may repeat a process of moving the probe forward again to insert the measurement ball into the next gear trough when the work gear rotates by an interval between the gear trough and the next gear trough while the probe is moved rearward from the work gear.

The gear inspection method may further include a fourth step of measuring a displacement measurement value of the probe, deriving digital values based on the displacement measurement values measured at the gear troughs symmetrical to each other when the work gear completely rotates from the start position, and displaying the digital values on the display unit connected to the controller.

The work gear may be unclamped in the fourth step.

The gear inspection apparatus and the gear inspection method using the same according to the exemplary form of the present disclosure may automatically inspect a gear for processing quality that affects vibration and noise properties and a performance of a vehicle, thereby improving an inspection speed and inspection reliability.

In addition, the present disclosure may improve a working environment and workability by simultaneously measuring the over ball diameter (OBD) and the gear run-out which are dimension measurement and vibration measurement that may check processing quality of the work gear.

In addition, other effects, which may be obtained or expected by the exemplary forms of the present disclosure, will be directly or implicitly disclosed in the detailed description of the forms of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
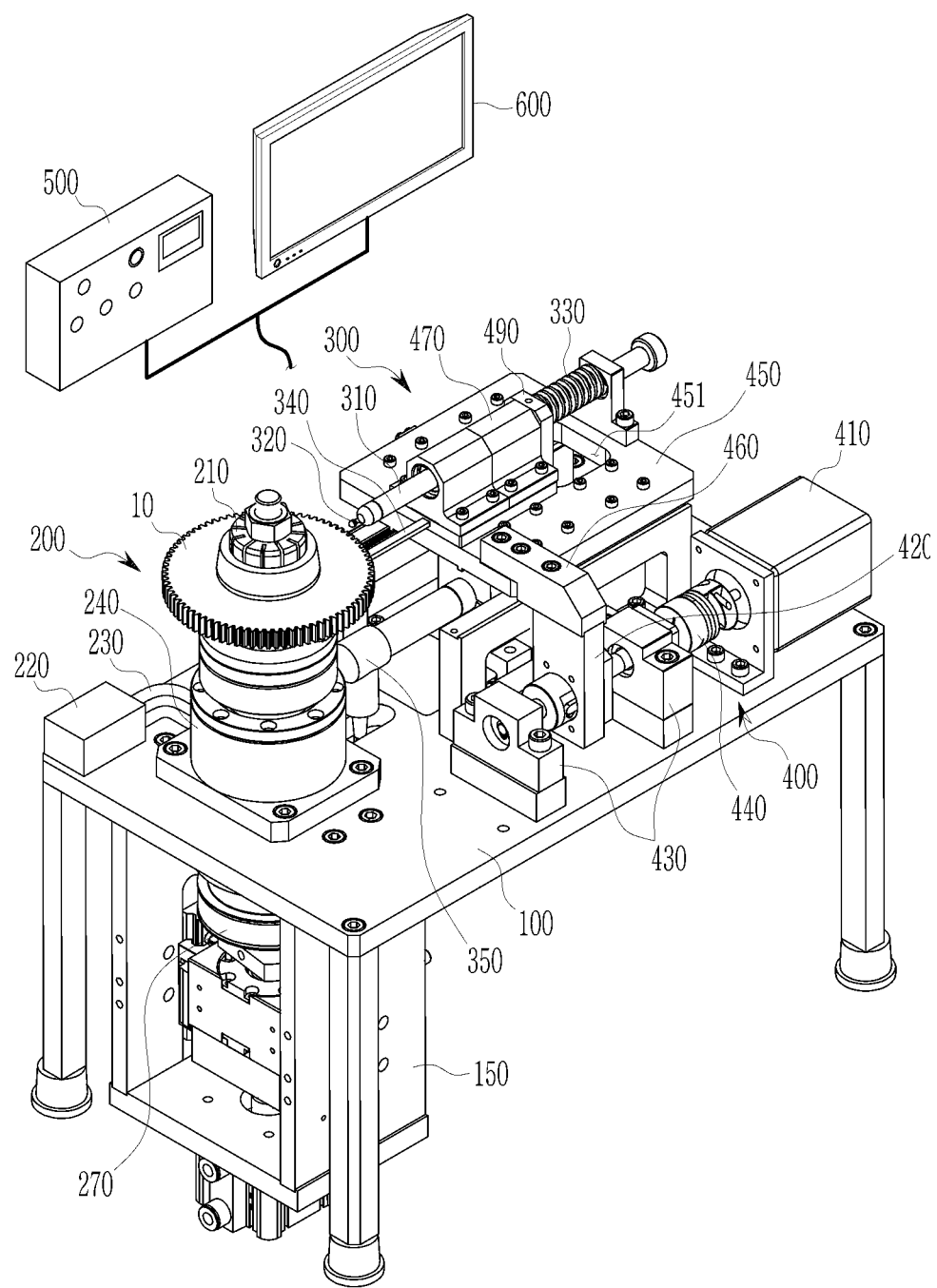
FIG. 1 is a front perspective view of a gear inspection apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Therefore, the exemplary forms disclosed in the present disclosure and the configurations illustrated in the drawings are just the exemplary forms of the present disclosure and do not represent all the technical spirit of the present disclosure. Accordingly, it should be appreciated that various equivalents and modified examples capable of substituting the exemplary forms may be made at the time of filing the present application.

A part irrelevant to the description will be omitted to clearly describe the present disclosure, and the same or similar constituent elements will be designated by the same reference numerals throughout the present disclosure.

The size and thickness of each component illustrated in the drawings are arbitrarily shown for understanding and ease of description, but the present disclosure is not limited thereto. Thicknesses of several portions and regions are enlarged for clearly describing the above.

Throughout the present disclosure, unless explicitly described to the contrary, the word "comprise" and variations such as "comprises" or "comprising" will be understood to imply the inclusion of stated elements but not the exclusion of any other elements.

In addition, the term "unit", "means", "part", "member", or the like, which is described in the specification, means a unit of a comprehensive configuration that performs at least one function or operation.

Figure 2:
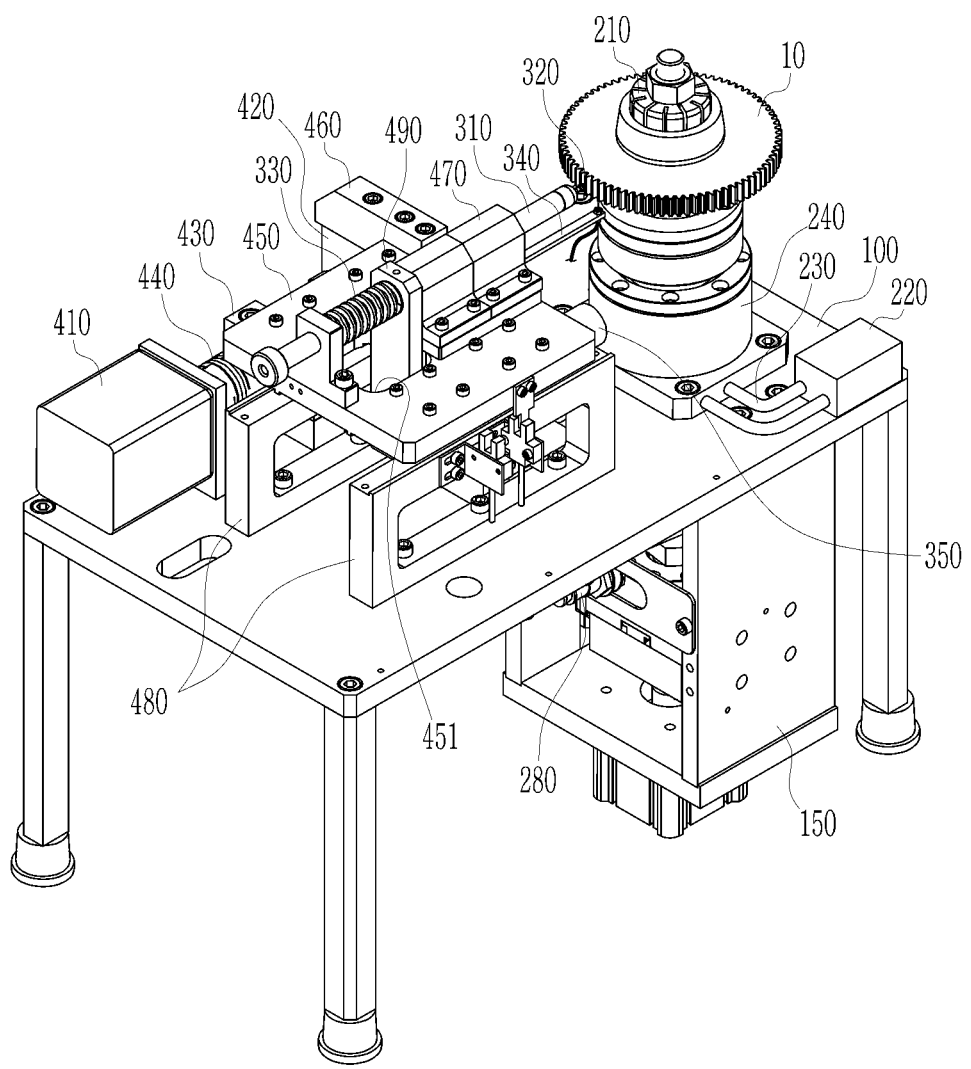
FIG. 2 is a rear perspective view of the gear inspection apparatus according to the exemplary form of the present disclosure.
Figure 3:
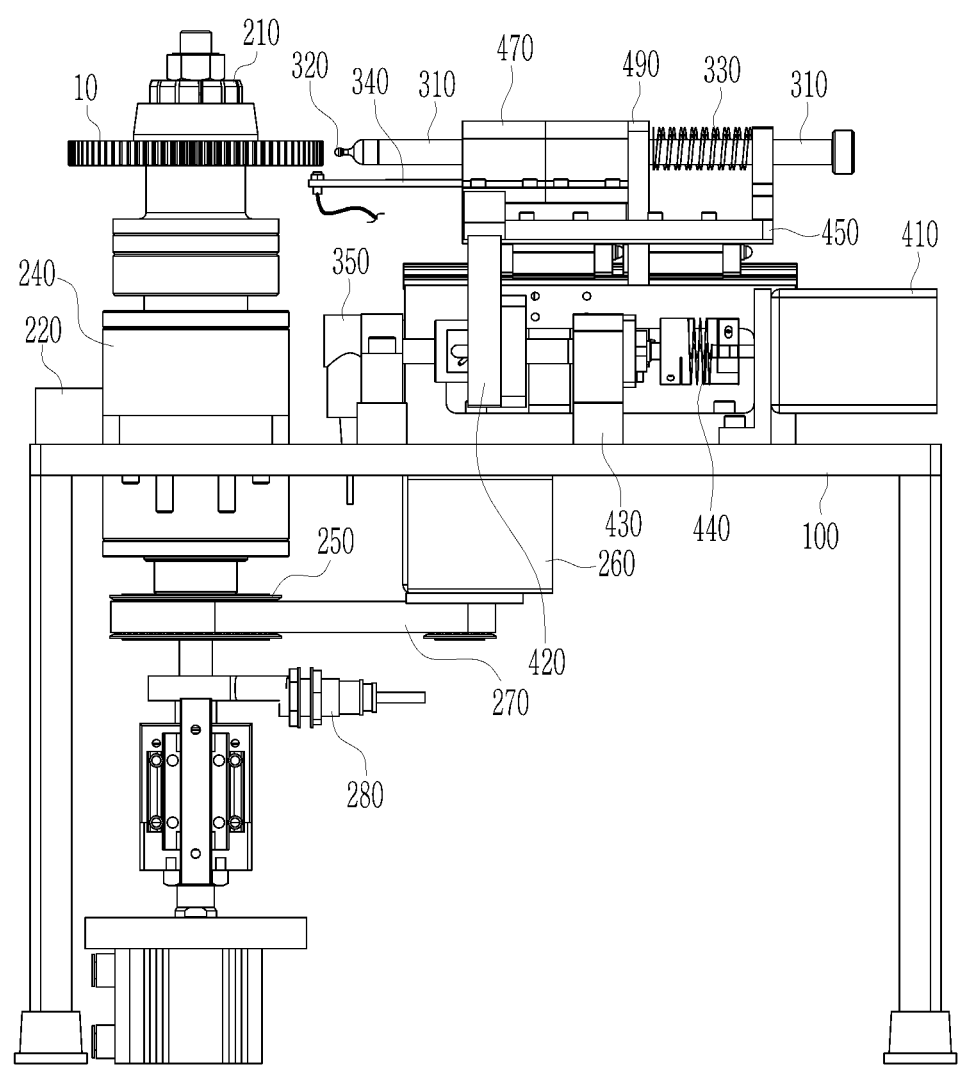
FIG. 3 is a side view of the gear inspection apparatus according to the exemplary form of the present disclosure.
Figure 4:
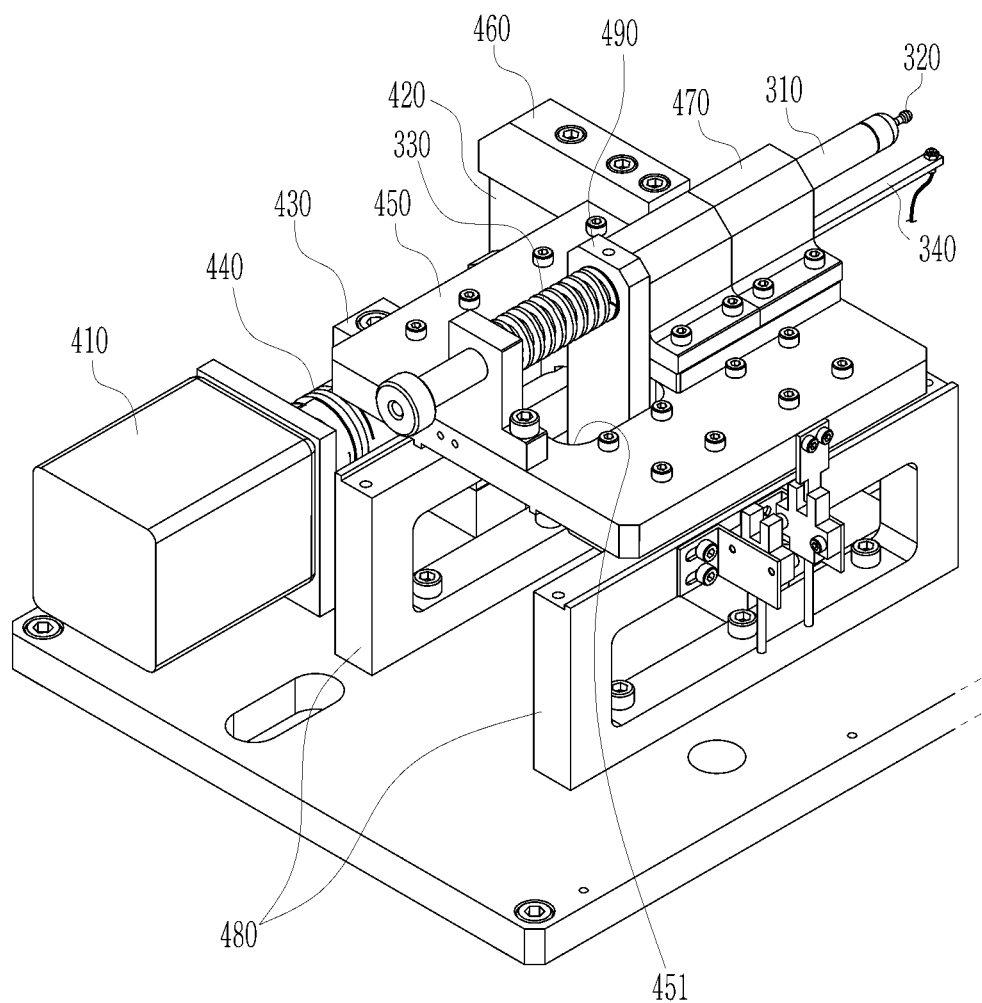
FIG. 4 is a rear enlarged view of a measurement unit and a drive unit applied to the gear inspection apparatus according to the exemplary form of the present disclosure.
Figure 5:
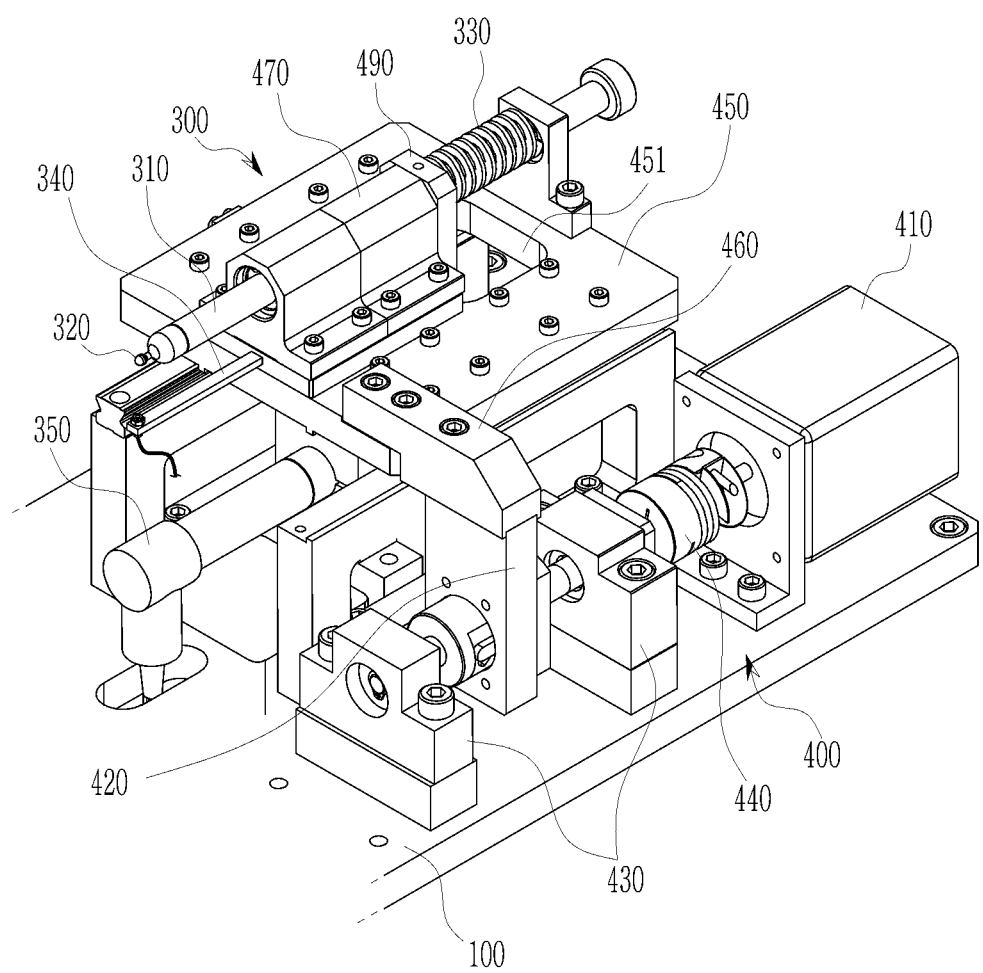
FIG. 5 is a front enlarged view of the measurement unit and the drive unit applied to the gear inspection apparatus according to the exemplary form of the present disclosure.

FIGS. 1 and 2 are front and rear perspective views of a gear inspection apparatus according to an exemplary form of the present disclosure, FIG. 3 is a side view of the gear inspection apparatus according to the exemplary form of the present disclosure, and FIGS. 4 and 5 are front and rear enlarged views of a measurement unit and a drive unit applied to the gear inspection apparatus according to the exemplary form of the present disclosure.

A gear inspection apparatus and a gear inspection method using the same according to the exemplary form of the present disclosure are configured to inspect a processed work gear 10 for processing quality.

As an example, the work gear 10 is representatively applied to a transmission of a vehicle.

The gear inspection apparatus is configured to inspect the work gear 10 for processing quality in order to perceive vibration and noise properties and a performance of the transmission to which the work gear 10 is applied.

A side of a mounting unit 200 on which the work gear 10 is mounted is defined as a front side prior to description of the gear inspection apparatus and the gear inspection method using the same according to the exemplary form of the present disclosure.

In addition, a controller 500 and a display unit 600, which are applied to the gear inspection apparatus and the gear inspection method using the same according to the exemplary form of the present disclosure, are illustrated only in FIG. 1.

Referring to FIGS. 1 and 2, the gear inspection apparatus includes the mounting unit 200, a measurement unit 300, and a drive unit 400 which are mounted on a frame 100, and the controller 500 and the display unit 600 which are configured outside the frame 100.

As illustrated in FIGS. 1 to 3, the mounting unit 200 is installed at a front side of the frame 100 to rotate the processed work gear 10.

The mounting unit 200 includes a clamping unit 210, a supply unit 220, a spindle 240, a spindle motor 250, and an origin detecting sensor 280.

First, the clamping unit 210 is installed at an upper side of the front side of the frame 100. The clamping unit 210 may clamp the work gear 10 by being inserted into a rotation center of the work gear 10.

The clamping unit 210 may be configured as a collet, an arbor, or the like.

When the clamping unit 210 configured as described above is inserted into the rotation center of the work gear 10, the clamping unit 210 is expanded with uniform force outward toward the work gear 10, thereby clamping an interior of the rotation center of the work gear 10.

Here, the supply unit 220 is connected to the clamping unit 210 in order to adjust an operation of the clamping unit 210.

That is, when the clamping unit 210 is inserted into the work gear 10, the clamping unit 210 is expanded by pneumatic pressure selectively supplied from the supply unit 220, thereby clamping the work gear 10.

The supply unit 220 is connected to the clamping unit 210 through a pneumatic hose 230. The supply unit 220 selectively supplies the pneumatic pressure to the clamping unit 210 or cuts off the supply of the pneumatic pressure, thereby expanding the clamping unit 210 or contracting the clamping unit 210 to an initial state.

The spindle 240 is connected to a rotation center of the clamping unit 210 from below the clamping unit 210.

The spindle 240 is installed on the frame 100 and may rotate the clamping unit 210 from below the clamping unit 210.

A belt pulley 250 is mounted at a lower end of the spindle 240 positioned below the frame 100.

The spindle motor 260 is installed below the frame 100. The spindle motor 260 is connected to the belt pulley 250 through a belt 270.

Therefore, driving power of the spindle motor 260 is transmitted to the belt pulley 250 through the belt 270, such that the spindle 240 may be rotated by a predetermined angle.

Here, the origin detecting sensor 280 is installed below the spindle 240 to compensate for eccentricity of the spindle 240.

The origin detecting sensor 280 may be installed to compensate for vibration of the spindle 240.

Referring to FIGS. 4 and 5, the measurement unit 300 may measure values desired to measure a dimension or vibration of the work gear 10 while moving forward toward the work gear 10 mounted on the mounting unit 200 or moving rearward.

The measurement unit 300 includes a probe 310, a measurement ball 320, a spring 330, a gear tooth detecting sensor 340, and a displacement sensor 350.

First, the probe 310 is installed at an upper side of a rear side of the frame 10 so as to correspond to the work gear 10.

The probe 310 is formed in the form of a stick. The measurement ball 320 is provided at a tip of the probe 310 which is directed toward the work gear 10.

The measurement ball 320 may come into contact with a gear trough of the work gear 10 when the probe 310 moves forward.

Further, the other end of the probe 310 is inserted into the spring 330. The spring 330 may provide the probe 310 with elastic force.

Here, a front side of the spring 330 is supported by a fixing block 490 of the drive unit 400 which will be described below. Therefore, the spring 330 may be compressed when the probe 310 moves forward, and on the contrary, the spring 330 may be restored when the probe 310 moves rearward.

In one form, the gear tooth detecting sensor 340 is configured to be movable forward and rearward, together with the probe 310, relative to the work gear 10.

The gear tooth detecting sensor 340 may sense a gear crest of the work gear 10 so as to allow the measurement ball 320 to accurately come into contact with the gear trough of the work gear 10.

The gear tooth detecting sensor 340 may include an optical sensor, a laser sensor, and the like.

Further, the displacement sensor 350 is disposed below the probe 310. The displacement sensor 350 may detect a magnitude of a movement displacement of the probe 310 and transmit the magnitude of the movement displacement to the controller 500.

That is, the displacement sensor 350 may measure a displacement value derived from movement distances or positions of the probe 310 and transmit the displacement measurement value to the controller 500.

Here, the displacement sensor 350 may be configured as a rectilinear displacement sensor. The types of rectilinear displacement sensors may include an optical type, a magnetic type, and the like.

In an exemplary form, the drive unit 400 is installed at the upper side of the rear side of the frame 100 so as to be connected to the measurement unit 300. The drive unit 400 may move the probe 310 forward and rearward.

Here, the drive unit 400 may include a drive motor 410, a moving block 420, an auxiliary block 450, rails 480, and the fixing block 490.

First, the drive motor 410 is installed on the frame 100. Here, the drive motor 410 may include a servo motor or a stepping motor.

The moving block 420 may be moved forward and rearward by the drive motor 410.

Here, the moving block 420 is disposed between multiple guides 430 provided on the frame 100. The moving block 420 may be moved forward and rearward between the guides 430 by a ball screw 440 connected to a rotating shaft of the drive motor 410.

Meanwhile, the ball screw 440 is rotatably inserted into the guides 430. That is, the guides 430 may stably support front and rear portions of the ball screw 440.

In one exemplary form, the auxiliary block 450 may be connected to the moving block 420 through a connecting bracket 460 and may be moved forward and rearward above the frame 100.

The probe 310 is mounted above the auxiliary block 450 through a mounting bracket 470. In addition, a through hole 451 is formed at a center of the auxiliary block 450.

The rails 480 are installed on the frame below the auxiliary block 450 so that the auxiliary block 450 slides along the rails.

Therefore, the auxiliary block 450 may stably slide together with the probe 310 in a state in which a lower portion of the auxiliary block 450 is fitted with the rails 480.

Further, the fixing block 490 is mounted on the frame 100 through the through hole 451. The fixing block 490 may be positioned at a front side of the spring 330 in a state in which the probe 310 is movably inserted into the fixing block 490.

The fixing block 490 configured as described above may support the spring 330 in order to compress the spring 330 when the auxiliary block 450 moves forward.

In one form, the controller 500 may receive the displacement measurement value related to the position of the probe 310 which is measured by the measurement unit 300, and the controller 500 may convert the displacement measurement value into a digital value.

Here, the controller 500 may be electrically connected to the display unit 600 that displays the digital value. The display unit 600 may be a monitor.

Figure 6:
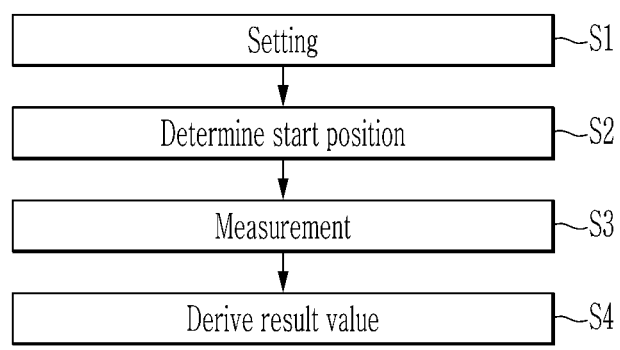
FIG. 6 is a flowchart illustrating a gear inspection method using the gear inspection apparatus according to the exemplary form of the present disclosure.

FIG. 6 is a flowchart illustrating a gear inspection method using the gear inspection apparatus according to an exemplary form of the present disclosure.

Referring to FIG. 6, the gear inspection method using the gear inspection apparatus configured as described above includes first, second, and third steps.

First, the first step is a step of setting the gear inspection apparatus.

In the first step, when the work gear 10 is mounted on the clamping unit 210, the type of the work gear 10 is selected. Thereafter, at least any one measurement item is selected from the dimension measurement and the vibration measurement of the work gear 10 (S1).

Here, when the work gear 10 is mounted on the clamping unit 210, the clamping unit 210 may clamp the work gear 10 by being supplied with pneumatic pressure from the supply unit 220.

The second step sets a start position by detecting a gear tooth of the work gear 10 by the gear tooth detecting sensor 340 provided in the measurement unit 300 (S2).

Here, in the second step, when the probe 310 moves forward toward the work gear 10 and the measurement ball 320 completely comes into contact with the gear trough of the work gear 10, the start position may be set through the gear tooth detecting sensor 340.

Thereafter, in the third step, the probe 310 is moved forward and rearward relative to the work gear 10 by the operation of the drive unit 400, and the measurement ball 320 provided at the tip of the probe 310 is inserted into each of the gear troughs of the work gear 10 until the work gear 10 completes 360° degree rotation from the start position, thereby measuring a dimension of the work gear 10 (S3).

That is, in the third step, first, while the probe 310 moves rearward from the gear trough of the work gear 10 at the predetermined start position, the work gear 10 is rotated by the operation of the mounting unit 200 by an interval between the gear trough at the predetermined start position and the next gear trough.

When the work gear 10 completely rotates, the probe 310 moves forward again by the operation of the drive unit 400, and the measurement ball 320 is inserted into the next gear trough.

The gear inspection apparatus repeats the aforementioned process until the work gear 10 makes 360° degree continuous rotation from the start position Further, the displacement measurement value of the probe 310 is measured, and when the work gear 10 completes the 360° degree rotation from the start position (when the third step is completed), the fourth step is performed.

In the fourth step, digital values are derived based on the displacement measurement values measured at the gear troughs symmetrical to each other, and the digital values are displayed on the display unit 600 connected to the controller 500 (S4).

Here, in the fourth step, the operation of the clamping unit 210 is stopped, such that the work gear 10 may be unclamped.

Therefore, based on the digital value displayed on the display unit 600, an operator may ascertain a value related to the measurement of dimension and vibration of the work gear 10 which is an inspection target.

Accordingly, the gear inspection apparatus and the gear inspection method using the same according to an exemplary form of the present disclosure may automatically inspect a gear for processing quality that affects vibration and noise properties and a performance of a vehicle, thereby improving an inspection speed and inspection reliability.

In addition, the present disclosure may improve a working environment and workability by simultaneously measuring the over ball diameter (OBD) and the gear run-out which are dimension measurement and vibration measurement that may check processing quality of the work gear.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

10: Work gear
100: Frame
150: Casing
200: Mounting unit
210: Clamping unit
220: Supply unit
230: Pneumatic hose
240: Spindle
250: Belt pulley
260: Spindle motor
270: Belt
280: Origin detecting sensor
300: Measurement unit
310: Probe
320: Measurement ball
330: Spring
340: Gear tooth detecting sensor
350: Displacement sensor
400: Drive unit
410: Drive motor
420: Moving block
430: Guide
440: Ball screw
450: Auxiliary block
451: Through hole
460: Connecting bracket
470: Mounting bracket
480: Rail
490: Fixing block
500: Controller
600: Display unit

What is claimed is:

1. A gear inspection apparatus, comprising:
a measurement unit including a probe installed to be movable forward and rearward relative to a work gear rotatably mounted on a frame, the measurement unit configured to measure a dimension of the work gear configured to rotate, by a measurement ball provided at a tip of the probe;

a drive unit installed on the frame so as to be connected to the measurement unit and configured to move the probe forward and rearward; and a controller configured to receive a displacement measurement value related to a position of the probe which is measured by the measurement unit, the controller configured to convert the displacement measurement value into a digital value, wherein the drive unit includes:
a drive motor installed on the frame;
a moving block which is moved forward and rearward by the drive motor;
an auxiliary block which is connected to the moving block, has an upper portion on which the probe is mounted, and moves forward and rearward together with the probe;
a rail installed on the frame below the auxiliary block so that the auxiliary block slides along the rail; and
a fixing block positioned at a front side of a spring in a state in which the probe is inserted into the fixing block, the fixing block configured to support the spring and compress the spring when the auxiliary block moves forward.

2. The gear inspection apparatus of claim 1, further comprising:
a mounting unit installed on the frame and configured to rotate the work gear.

3. The gear inspection apparatus of claim 2, wherein the mounting unit includes:
a clamping unit which is installed on an upper surface of the frame and inserted into a rotation center of the work gear;
a spindle connected to a lower portion of the clamping unit;
a spindle motor connected to the spindle through a belt and configured to rotate the spindle by a predetermined angle; and
a supply unit installed on the upper surface of the frame and connected to the clamping unit, and configured to selectively supply pneumatic pressure to the clamping unit so that the clamping unit clamps or unclamps the work gear.

4. The gear inspection apparatus of claim 3, wherein an origin detecting sensor installed on the spindle and configured to compensate for an eccentricity of the spindle, is.

5. The gear inspection apparatus of claim 1, wherein the measurement unit includes:
a spring into which an end of the probe is inserted and which provides the probe with an elastic force;
a gear tooth detecting sensor which is movable forward and rearward, together with the probe, relative to the work gear and senses a gear crest of the work gear so that the measurement ball comes into contact with a gear trough of the work gear; and
a displacement sensor configured to detect a magnitude of a movement displacement of the probe and transmit the magnitude of the movement displacement to the controller.

6. The gear inspection apparatus of claim 1, wherein the controller is electrically connected to a display unit that displays the digital value.

7. A gear inspection method using the gear inspection apparatus according to claim 1, the gear inspection method comprising:
a first step of selecting a type of the work gear and selecting at least any one measurement item from a dimension measurement and a vibration measurement when the work gear is mounted on a clamping unit of a mounting unit;
a second step of setting a start position by detecting a gear tooth of the work gear by a gear tooth detecting sensor of the measurement unit; and
a third step of measuring the dimension of the work gear by moving the probe of the measurement unit forward and rearward relative to the work gear and inserting the measurement ball into each of gear troughs of the work gear until the work gear completely rotates from the start position.

8. The gear inspection method of claim 7, wherein, in the first step, the work gear is clamped by the clamping unit when the work gear is mounted.

9. The gear inspection method of claim 7, wherein, in the second step, the start position is set by the gear tooth detecting sensor when the probe moves forward toward the work gear and the measurement ball completely comes into contact with a corresponding gear trough of the work gear.

10. The gear inspection method of claim 7, wherein until the work gear completely rotates from the start position, the third step repeats a process of moving the probe forward again to insert the measurement ball into a next gear trough when the work gear rotates by an interval between the corresponding gear trough and the next gear trough while the probe is moved rearward from the work gear.

11. The gear inspection method of claim 7, further comprising:
a fourth step of measuring the displacement measurement value of the probe, deriving digital values based on displacement measurement values measured at the gear troughs symmetrical to each other when the work gear completely rotates from the start position, and displaying the digital values on a display unit connected to the controller.

12. The gear inspection method of claim 11, wherein the work gear is unclamped in the fourth step.

* * * * *